Aug. 19, 1958 W. A. BRASTAD ET AL 2,848,108
METHOD AND APPARATUS FOR ELECTROSTATIC SEPARATION
Filed Dec. 31, 1956 7 Sheets-Sheet 2
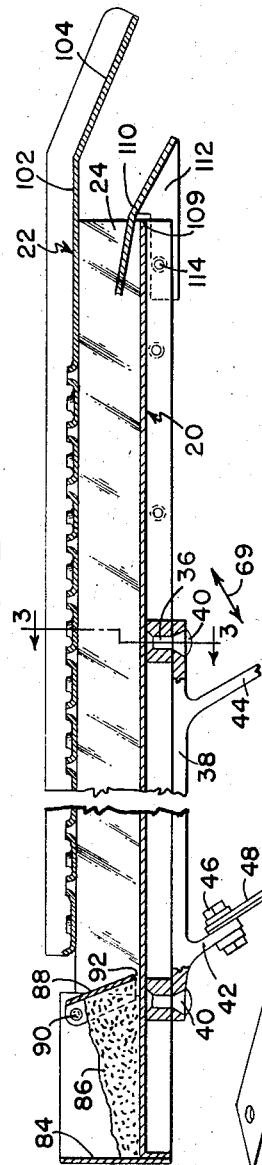
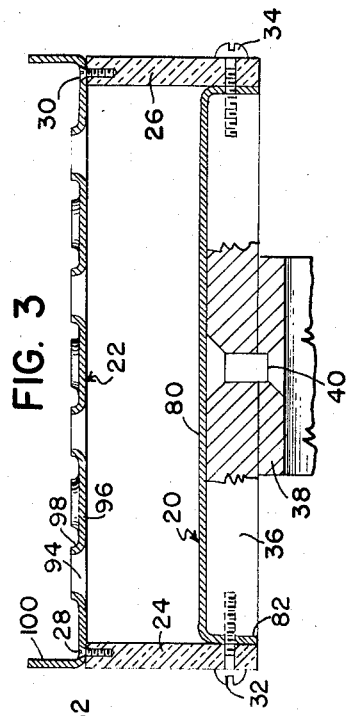
INVENTORS
WILLIAM A. BRASTAD
ELI C. GEAR
BY
William C. Babcock
ATTORNEY

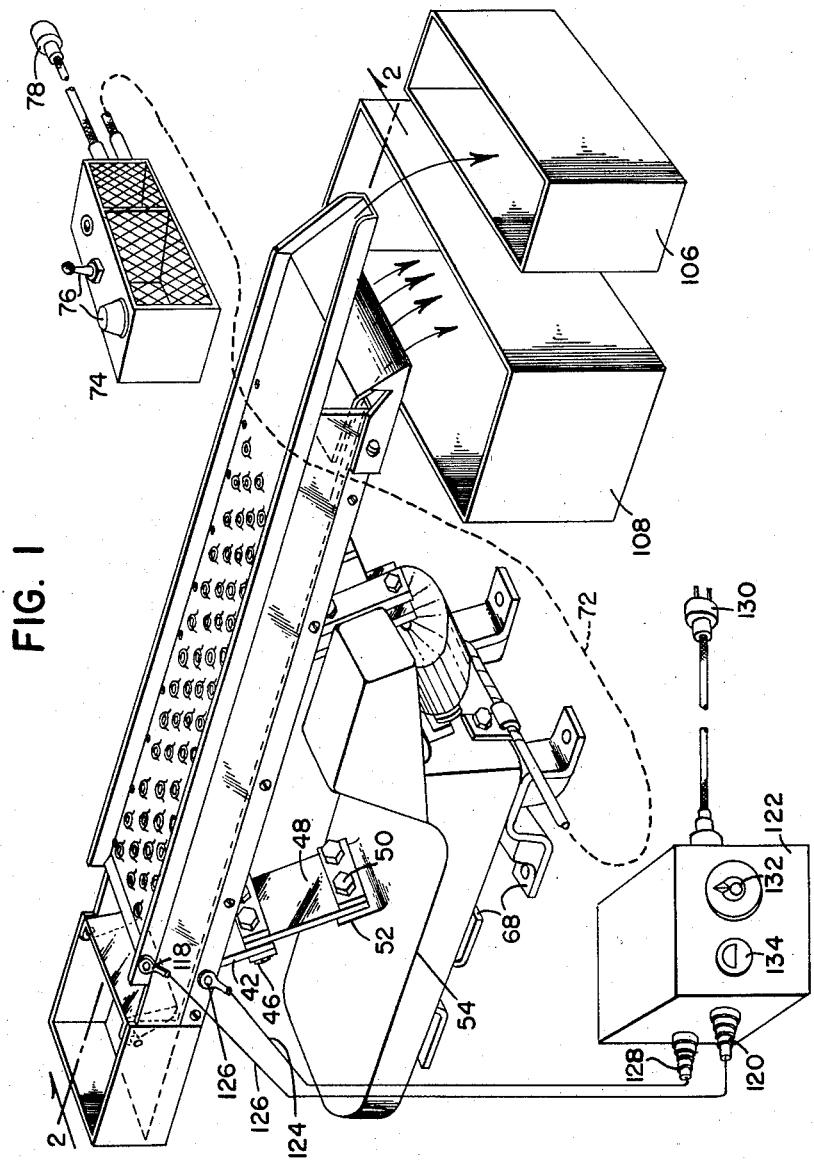

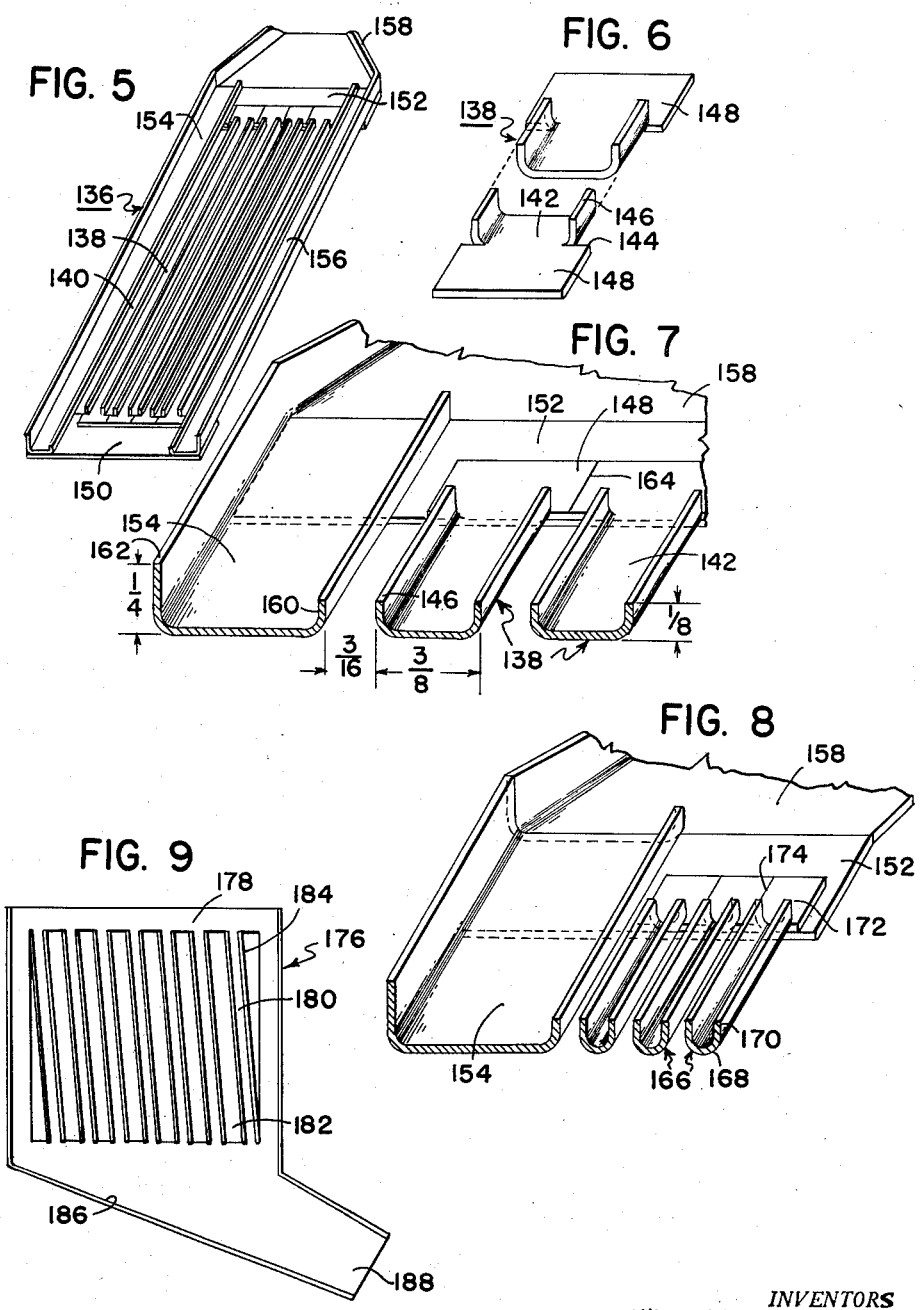

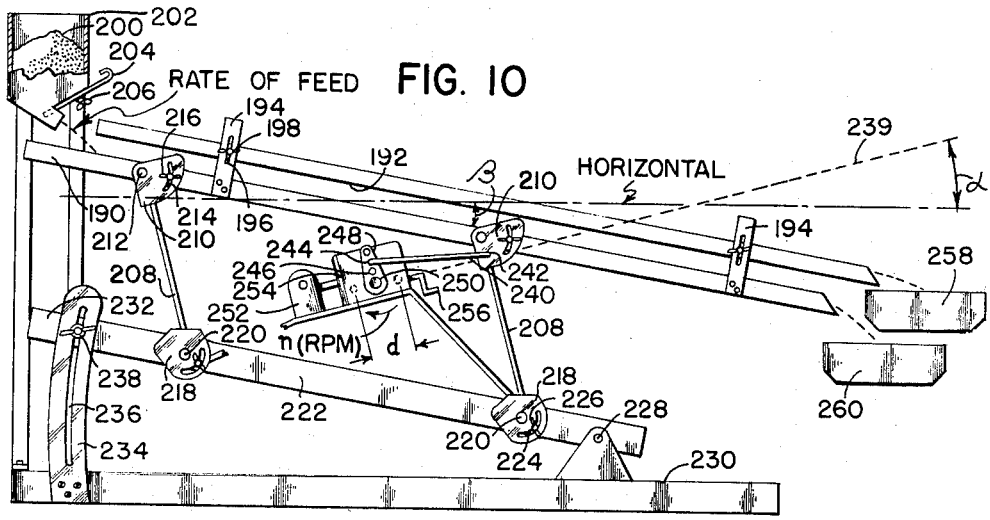
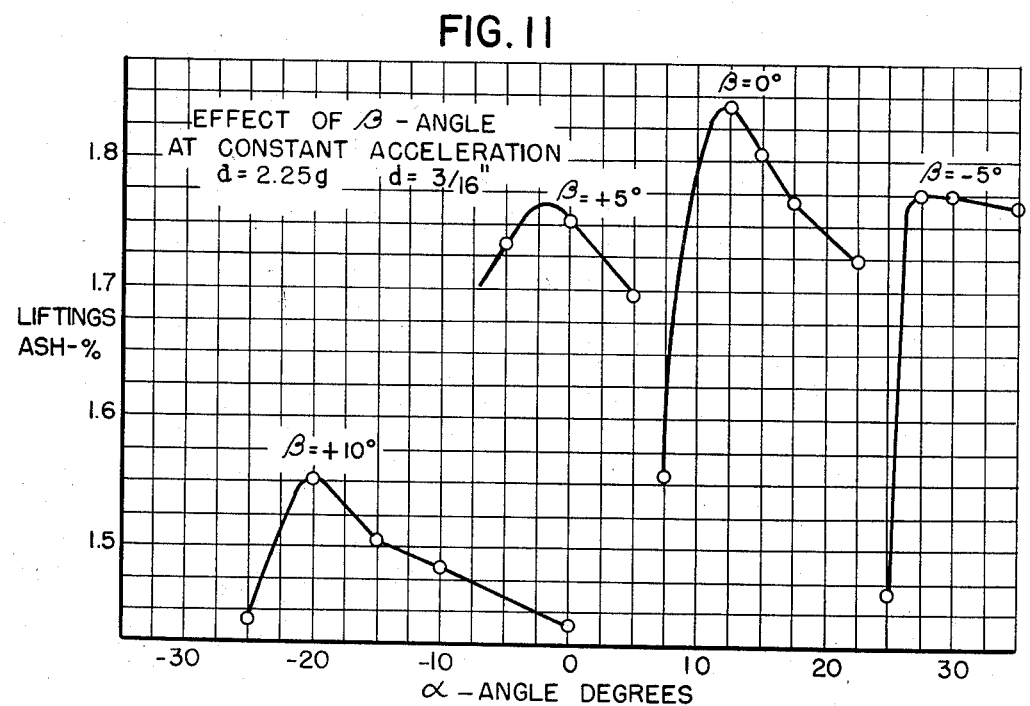

Aug. 19, 1958 W. A. BRASTAD ET AL 2,848,108
METHOD AND APPARATUS FOR ELECTROSTATIC SEPARATION
Filed Dec. 31, 1956 7 Sheets-Sheet 7
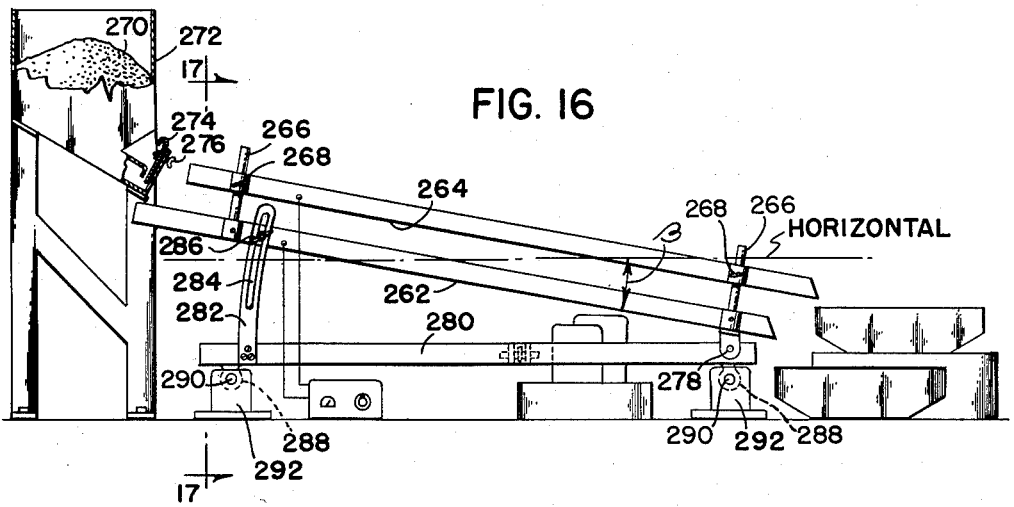
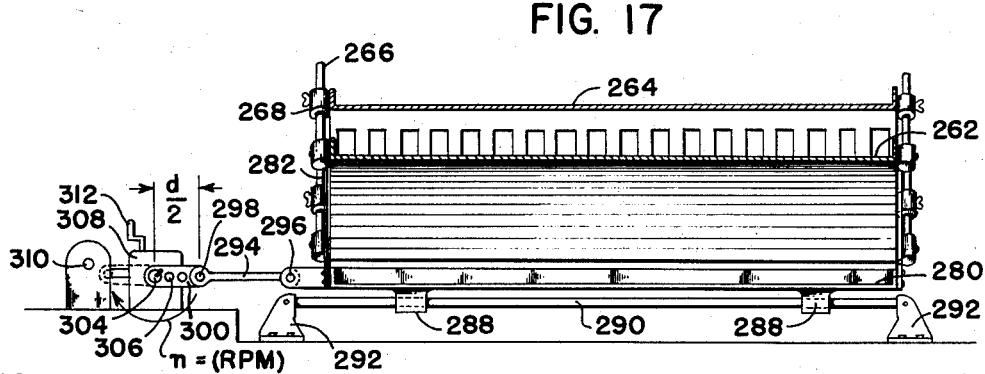
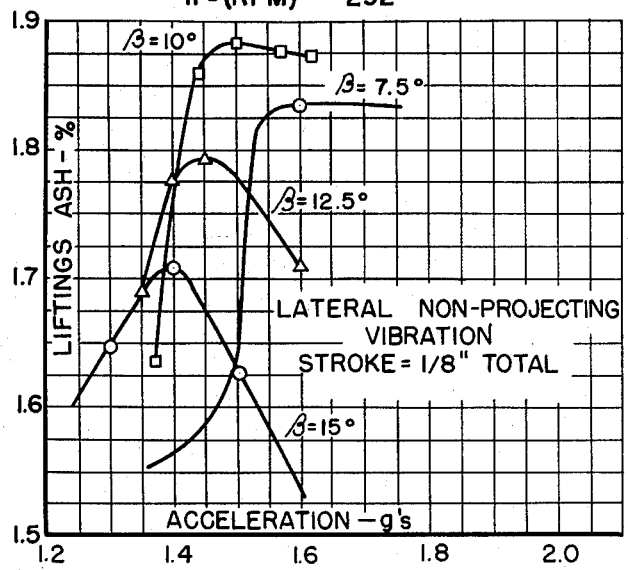
INVENTORS
WILLIAM A. BRASTAD
ELI C. GEAR
BY
William C. Babcock
ATTORNEY

2,848,108

METHOD AND APPARATUS FOR ELECTROSTATIC SEPARATION

William A. Brastad, Minneapolis, Minn., and Eli C. Gear, San Diego, Calif., assignors to General Mills, Inc., a corporation of Delaware Application December 31, 1956, Serial No. 631,860

28 Claims. (Cl. 209—127)

The present invention relates to electrostatic separation, and more particularly to the application of electrostatic methods to the separation of mixtures of non-conductors such as are found in the agricultural field. A specific application of the invention is in the separation of cereal stocks for the purification of flour middlings and sizings by removal of branny particles.

The development of electrostatic methods and apparatus for separations started at a relatively early date. As early as 1880 an electrostatic middlings purifier was proposed for separation of bran from flour. Electrostatic methods were also proposed at these early dates for application to ores and to mixtures of both electrically conducting and non-conducting particles.

The development of improved high voltage sources, such as the vacuum tube rectifier, and the growth of better and more uniform conveying methods, such as the high frequency vibratory conveyor, have resulted in widespread activity in the electrostatic separation field in more modern years. However, although considerable success has been achieved in working with metallic ores or mixtures in which at least one of the particles is a relatively good electrical conductor, the use of electrostatic separation with agricultural products has been limited and relatively unsuccessful. No method or apparatus has been previously devised for separation, on a satisfactory commercial scale, of cereal stocks, particularly comminuted wheat which includes pure branny particles, pure endosperm particles, and particles in which both bran and endosperm are attached in varying proportions.

As far as the teachings and suggestions of the prior art are concerned, the patents and publications in the field of electrostatic separation are generally contradictory and confusing and are characterized by the absence of any clear or accurate teaching as to the theory, methods, or apparatus which might be suitable for the specific separation of particular substances. It is known, but has not been generally recognized, that particles to be separated may be given different charges in different ways. For example, the development of "static" charges by friction between different materials has been known for many years. Typical of this method of charging is the classical physics experiment in which a rubber rod, when rubbed with fur, acquires a negative electrical charge. As is well known, the two materials which are engaged with each other acquire equal and opposite charges, and the polarity of the particular charge depends in each case on the nature of the material. Various materials have even been classified in a graduated scale characterized by the fact that when two materials on the scale are engaged, the material which is higher on the scale will have a positive charge, while the material which is relatively lower on the scale will be given a negative charge. These static or frictional charges have been suggested for use in the electrostatic separation field by frictionally sliding the stock across a support made of a material selected so that one type of particle becomes charged positively and the other type negatively.

It has also been recognized that particles may be charged by induction. In such cases, the particles are passed into an electrostatic field, i. e., near a charged electrode, and the particles are at least temporarily grounded in some manner while still in the field. The use of induced charges has been emphasized to some extent in the electrostatic separation field in connection with mixtures of conducting and non-conducting particles. In these cases, when the mixture of particles is brought into the field of an electrode and grounded, the metals or conductors are able to gain or lose electrons readily as compared to the non-conductors. If the ground connection is broken while the particles are still within the field of the electrode, the metallic particles will be left with a charge which is opposite in polarity to that of the charging electrode, while the non-conductors will be relatively uncharged.

In other cases, the particles to be separated have been subjected to a so-called spray discharge. In this case, the particles are passed between a discharge electrode, i.e., a sharply defined or point electrode, and a support so as to be subjected to the bombardment of ionized particles from the spray electrode. Here again, the method has been primarily useful with mixtures of conductors and non-conductors, since the conducting particles, if grounded on a suitable support, can lose the charge acquired during the bombardment, while the non-conductors will retain such charges. Spray discharges have not been used successfully for purification of flour middlings or similar mixtures of non-conductors. In addition, the danger of sparks in such a method makes its use impractical where there is a dust and explosion hazard, as in the flour milling field.

Finally, in some cases, use has been made of a pyroelectric effect in which an increase in the temperature of the particles causes variations in the electrical charge carried by some of the particles to an extent facilitating electrostatic separation.

The devices and methods of the prior art make little attempt to coordinate the various types of charges. In general, successful results have been achieved mainly where either the mixture to be separated included both conductors and non-conductors, i. e., metallic and non-metallic particles, or in cases where the mixture included two particles, one of which could be charged positively and the other negatively, or which could at least be charged with the same polarity but to a substantially different degree, by frictional engagement with a particular support. In the first case, of course, the separation would be based on the use of induced or spray charges, while in the second case, the frictional charges could be used satisfactorily as a basis of separation.

These prior methods and devices have not been successful, however, where the particles to be separated were both non-conductors, and where both types of particles received frictional charges of the same polarity and of substantially the same degree by engagement with the particular supports. Thus for example, the purification of flour middlings has not been successfully achieved by electrostatic methods because both the bran and and endosperm particles of the wheat berry are relative non-conductors of electricity. In the milling process, the endosperm particles of the wheat berry are the source of the finished flour, while the branny particles are undesirable and are generally disposed of as feed. Their differences in electrical conductivity are so slight that known methods and apparatus cannot practicably effect a sufficiently precise separation.

Furthermore, we have found that both the bran and pure endosperm particles which are present in comminuted wheat stock obtain frictional charges of the same polarity when engaged by various supports. Experiments with many different types of material for the support have failed to provide a material which would charge the branny particles with one polarity and the endosperm particles with another. In all cases which we have encountered, both the bran and endosperm particles acquire a positive frictional charge as a result of rubbing contact with the support material, whether that material is metallic or non-metallic.

While these frictonal charges are slightly different in magnitude per unit weight of material, the difference is so slight, with stocks of normal milling moisture content, that satisfactory separations on the basis of frictional charges are impractical. Such separations may be made, as a laboratory experiment, in certain types of known apparatus, provided the stock to be separated is dried to a relatively great extent, i. e., to a maximum of say, 6% moisture content. A drying operation of this scope, however, makes the commercial use of such apparatus impractical since the expense of the drying operation is so great, and since the wheat must have a substantially greater minimum moisture content for satisfactory breaking or comminution during the remainder of the milling process.

Furthermore, in the stocks encountered in flour milling, there is an infinite range of particles of only slightly different electrical characteristics. As noted above, this range extends from pure bran to pure endosperm and includes a major portion of intermediate particles in which both bran and endosperm remain attached to each other in widely varying proportions, depending on the effectiveness and characteristics of the prior steps in the milling operation. Since even the pure bran and endosperm at the limits of this range differ only slightly in electrical properties, it is evident that extremely precise methods and apparatus will be required to effect useful separations at any given intermediate point in this range or spectrum.

With the foregoing history and defects of the prior art in view, it is accordingly one object of the present invention to provide an improved method and apparatus for electrostatic separation.

Another object is the provision of such a method and apparatus which will be capable of attaining precise and accurate separations with stocks in which the differences in electrical properties (such as conductivity) are slight.

Another object is the provision of improved methods of manipulating organic poorly-conducting particles in an electrostatic field to insure optimum charging for precise separation.

A further object is an improved processing combination of such manipulating steps in which a supporting electrode for the particles is oriented and vibrated within carefully defined ranges of operating conditions to obtain optimum charging and separation of organic poorly-conducting particles and in which such organic particles are given an opportunity for prompt removal from the field whenever the particles have moved a predetermined distance above such electrode against the downward force of gravity.

Another object is an improved combination of such manipulative steps in which the direction, amplitude and frequency of vibration of such a supporting electrode are coordinated within carefully defined ranges dependent on the angular orientation of the electrode.

A still further object is an improved method and apparatus for electrostatic separation which will apply inductive charging methods to particles which are all relatively non-conducting, and in which the induced charges are made to dominate the frictional charges in order to achieve efficient and precise separations regardless of the frictional charges.

Another object is the provision of a method and apparatus in which the particles are charged by inductive methods and in which account is taken of the particular frictional charges acquired by the particles.

Still another object of the invention is the provision of a method and apparatus for electrostatic separation of particles which are both relatively non-conducting and which both acquire frictional charges of the same polarity through engagement with other materials.

A further object is the provision of an improved method and apparatus for efficient electrostatic purification, on a commercial scale, of comminuted wheat stocks such as flour middlings.

Other objects and advantages of the invention will be apparent from the following specification:

In general, these objects are accomplished by a novel combination of processing and apparatus features in which the particles of stock to be separated are fed along the upper surface of a conducting plate or supporting electrode, which is maintained at a predetermined electrostatic potential. An electrostatic field is provided above the electrode, for example by means of an upper electrode plate of different predetermined potential spaced above the lower electrode and extending along the lower plate for a substantial distance in the direction of feed. Preferably the upper and lower electrode plates are spaced from each other a distance less than one-third of their common effective length.

According to the present invention, the particles are repeatedly manipulated in a particular manner, while they pass through the field, to expose many different areas of the surfaces of the particles to the effect of the electrostatic field by repeatedly contacting these different areas with the supporting electrode while the particles are in the field. The desired manipulations are preferably achieved by rapidly vibrating the lower electrode with careful coordination of the electrode orientation, and the direction, amplitude and frequency of vibration as more specifically defined below.

These repeated manipulations of the particles are further carried out in a manner which insures thorough conditioning of the particles. Thus the repeated contacts of different surface areas of the particles must be prolonged or continued to provide a full opportunity for thorough exposure of such areas to the electrostatic charging effects before the particles leave the field.

The invention also contemplates the prompt removal of desired particles from the electrostatic field and their separate collection, whenever such desired particles have been sufficiently exposed to the field effects to cause movement of the particles upwardly against the force of gravity to a predetermined height above the supporting electrode.

The series of repeated contacts which result from the desired manipulative steps may serve a multiple purpose. First of all, in the case of vibrations in a direction intersecting the plane of the electrode, the stock may be projected repeatedly into the space above the lower electrode. In other words, the rapid vibrations feed the stock along the plate in a condition which permits the electrostatic field to act on the particles with maximum effect, as soon as the particles are ready.

Secondly, the series of rapid vibrations thoroughly agitates the particles and gives them an adequate opportunity for frictional engagement with the support so that each particle can acquire its maximum frictional charge, and presently it appears that there is a definite limit to the frictional charge which can be acquired.

Thirdly, the intermittent contacts of different areas of the particles against the supporting electrode in effect ground these different areas of the particles at repeated intervals, so that they are enabled to acquire their full or maximum induced charge while they are within the uniform electrostatic field. We have found that, after a suitable conditioning period, these induced charges may be made great enough to dominate the frictional charges in certain types of material, such as the bran and endosperm of wheat stock.

The available methods for developing frictional charges alone are not sufficiently precise or subject to control to insure the building up on the bran and endosperm particles of normal milling moisture content of total charges which differ substantially enough to serve as a basis of separation. Fortunately these total frictional charges are small, so that much greater induced charges can be put on the respective particles by the precise and controlled methods and apparatus of the present invention. These induced charges can be made greater so that they dominate the frictional charges, and also so that the difference in total charge-to-mass ratios of the respective particles, such as bran and endosperm, becomes great enough to make accurate separations possible.

If this conditioning or charging operation is continued long enough, the charge-to-mass ratio approaches for practical purposes a maximum (for any given field strength and degree of agitation) which is characteristic of the particular material. Thus, by suitable adjustment of the degree of agitation and the potential of the upper charging and attracting electrode, the difference or spread between the maximum charge-to-mass ratios of two types of material can often be increased to the point where accurate and precise separations become practical. Furthermore, the methods and apparatus of the present invention have the advantage that all like particles, i. e., all the particles of any one particular type, appear to be charged uniformly, so that the accuracy and sharpness of separation achieved will be high.

Since the particles in question are relatively non-conducting, there is a certain time element involved in the acquisition of these charges, particularly the induced charges. For instance, the bran and endosperm particles may be considered as dielectric materials, which, even though they are not highly conductive, can gain and lose electrons at a slow rate depending on contact with the supporting electrode and continued presence in the electrostatic field. This time required for charging may be likened to the "time constant" of a condenser.

By subjecting the particles a series of contacts, at a rapid rate and throughout a substantial distance along the electrode plate we make certain that every particle, before it leaves the electrostatic field, will have reached either its maximum charge-to-mass ratio or at least the critical charge-to-mass ratio which will suffice to project it upwardly out of the electrostatic field. And by using the upper electrode both as a charging electrode and as an attracting electrode during this conditioning process we make sure that each particle has a chance to be attracted as soon as it reaches this critical charge-to-mass ratio. In other words, the particles are constantly "on call," and as soon as any given particle is ready to accept the call, it will be separated immediately from the rest of the material.

On the contrary, in known types of apparatus, particularly those in which the stock is fed by roller electrodes, or steeply inclined smooth electrodes, there is no possibility of prolonging the passage of the material across a supporting electrode and through an electrostatic field for a sufficient period of time to insure that all particles are fully conditioned. Instead, some few particles which happen to make good contact initially may acquire a sufficiently complete induced and frictional charge, whereas other particles which did not make successful initial contact will be only partially charged. Furthermore, a particle which is sufficiently charged at one point may lose some of its charge before it reaches the attracting electrode and thus miss its opportunity for separation. Such a random method of charging may be satisfactory where the characteristics of the material are widely different as in the case of conductors versus non-conductors, but these methods and devices fail entirely when confronted with the problems solved by the present invention.

The desired control over the time of passage (i. e., time of conditioning) of the particles is achieved in the present case by suitable conditions of vibration and electrode orientation and length. Proper selection of these factors provides a means for prolonging the passage of the material across the lower electrode. In effect, the conditions of vibration constitute the primary means of moving the particles along the electrode, in contrast to gravitational means, or the combination of gravitational and electrostatic means, as in the case of more steeply inclined electrodes, and in contrast to rotational means, as in the case of roller electrodes.

As indicated above, the particles are subjected to a substantially uniform electrostatic field throughout this conditioning or charging process. To establish this field, the upper electrode necessarily has substantial length in the direction of feed of the material in order to expose particles to the electrostatic field long enough to condition them adequately. An important feature of the invention is that fact that it makes possible a precise adjustment of the potential of this upper electrode with respect to the potential of the lower electrode to a point where the critical charge-to-mass ratio required to lift a particle under the particular conditions of agitation, electrode separation and adjusted field strength falls just below the lowest maximum charge-to-mass ratio of the various particles which one desires to remove. For example, the potential can be adjusted, in the case of flour middlings, so that the brannier particles will be lifted to the upper electrode and removed. At the same time the potential must not be high enough to remove the remaining endosperm particles even when fully charged. Such a critical adjustment of the potential of the upper electrode is effective only when provision is made as suggested by the present invention for the thorough conditioning or charging of all the particles and the immediate attraction of the desired individual particles as soon as each one is adequately charged.

This removal is accomplished preferably by providing openings in the upper electrode so that the attracted particles will actually be projected upwardly through the openings and beyond the electrostatic field. The upper surface of the electrode may then be used as a conveying surface for removal of the projected particles. A particularly advantageous construction is one in which the upper electrode is not only provided with openings in the manner described, but is also vibrated rapidly during the separation process. Thus the upper electrode may serve as a vibratory conveyor to remove the projected particles from the field.

It should be noted that although perforated or open upper electrodes have been suggested in certain connections in the prior art, they have not been used in combination with a lower plate-like supporting electrode of substantial extent which is subjected to vibratory action to condition the particles over a relatively great length of path. Neither have such perforated electrodes been suggested in an apparatus in which precise adjustment of the relative potentials results in accurate and efficient separations achieved by the present invention and made possible by the thorough conditioning of the particles which takes place simultaneously with their passage through the attracting electrostatic field and by the immediate removal of the attracted particles from the conditioning and attracting field.

We have found that the specific conditions of vibration and electrode orientation which provide the best results in terms of adequate inductive charging, thorough conditioning and precise separation of organic poorly conducting particles can be varied within carefully defined limits. The changes in one particular operating condition, however, must be coordinated with changes in other conditions according to certain principles which we have discovered.

In this connection we have found that two types of operating conditions should be distinguished. One of these, which might be termed the "projecting" case, involves vibrations of the supporting electrode in directions defined by angles in a vertical plane which intersects the electrode in a line extending along the direction of feed of the particles. These directions may then be defined in terms of an angle "alpha" ($\alpha$), which is the angle between the direction of the linear reciprocating vibration strokes and the horizontal.

Positive values of alpha define a vibratory direction inclined upwardly at an acute angle above the horizontal and along the direction of feed of the particles. Negative values of alpha may be said to define a vibratory direction inclined downwardly at an acute angle below the horizontal and along the direction of feed. However, since the vibrations involve alternate movement in opposite directions, this negative alpha angle could also be said to define a vibratory direction inclined upwardly at an acute angle above the horizontal, but rearwardly in the direction opposite to the direction of feed of the particles.

The second type of operating condition, which might be termed the "non-projecting" case, involves vibrations in a horizontal plane. Specifically, this second case is limited to operating conditions in which the supporting electrode is inclined downwardly or "downhill" along the path of feeding movement of the particles, and in which the vibrations of the electrode are directed along a horizontal line extending transversely of the direction of feed, i. e., perpendicular to the vertical plane extending along the direction of feed.

In each of these cases, the angular orientation of the supporting electrode must be carefully chosen. This orientation may be defined in terms of an angle "beta" ($\beta$), which is measured in the vertical plane extending along the direction of feed and represents the angle between the plane of the electrode and the horizontal. A positive beta angle indicates a downward or "downhill" slope of the supporting electrode along the direction of feed. A negative beta angle indicates an upward or "uphill" slope along the direction of feed. The electrode is not desirably inclined transversely of the direction of feed because such inclination could produce uneven feeding with different depths of stock across the width of the machine, but this is merely a practical consideration.

Other factors, such as the rate of feed of stock, and the amplitude and frequency of the vibrations, must also be selected to obtain optimum results. In the case of flour milling stocks, best results are further insured by conditioning the stocks to at least a predetermined minimum moisture content, which should be not substantially less than 13% of the dry wheat weight, and preferably 14½%.

In both of these cases, as suggested above, the thorough conditioning of particles is quite dependent upon the characteristics of the vibrations used to convey the particles across the lower electrodes. Some conditions of vibration may result in a thick layer moving slowly whereas other vibratory conditions may cause a thin fast-moving layer. Various relative amounts of acceleration along the lower electrode and normal thereto may be employed. The manner in which particles are conveyed across the electrode has a critical effect upon the efficiency and purity of the separation. In the case of flour milling stocks, these differences in efficiency are believed to reflect changes in the relative ability of the bran and endosperm particles to acquire charges under different conditions of vibration.

In the projecting case, at a given feed rate the optimum vibration is dependent upon at least four factors:

(1) The frequency of vibration "$n$" measured in cycles per minute.

(2) The total length of stroke "$d$" in inches.

(3) The angle $\alpha$ between the direction of the vibration stroke and the horizontal, as defined above.

(4) The angle $\beta$ between the plane of the lower electrode and the horizontal, as defined above.

Each factor is characterized by a range of reasonable values through which excellent efficiency may be obtained by judicious selection of the other three variables. For instance frequencies of vibration from 400 to 3600 cycles per minute have been tried in conjunction with stroke lengths from 1½ to ⅟₁₆ inches. The lower values of frequency require longer strokes to produce sufficient acceleration for suitable conditioning.

Likewise, the angle $\alpha$ has been varied over the range $+45°$ to $-20°$. The larger positive values of $\alpha$ are required to provide a sufficient component of acceleration normal to the electrode when smaller accelerations are used. Negative values of $\alpha$ may be desirably used to retard the flow of particles by vibration when $\beta$ is so selected that the lower electrode is inclined somewhat downhill in the direction of conveying.

The angle $\beta$ has been found more critical than $\alpha$. Even with the electrode inclined as little as 15°, the efficiency of separation is impaired to the point that readjustment of the other factors can not restore the best operation. It is believed that larger values of $\beta$ tend to shift the control of particle conveying from vibrational means to combined gravitational and electrostatic means. When the electrode is sufficiently inclined that the particles feed along the electrode without vibration, then it can be said that the vibration is no longer the probable primary means for moving the particles along the electrode.

In this projecting case, we have found that the best possible results can be obtained with the supporting electrode oriented at or near the horizontal. In this case the angle beta is preferably zero and in any event should lie within the range from $-7½°$ to $+7½°$. As suggested herein, suitable correlation of other factors can give good separations for a substantially greater range of beta angles, but the best results will be achieved within the above limits.

With the beta angle established in this range, the direction of projecting vibration is chosen within the range of alpha angles from $-20°$ to $+45°$. The selection of a specific alpha angle should be made in accordance with the principles and examples set forth in detail below, as further exemplified by the specific formula about to be described. For a beta angle of zero, the preferred alpha angle for flour milling stocks is of the order of $+10°$ to $+20°$.

The amplitude and frequency of the vibrations should be selected to give acclerations of at least 1 "$g$" where "$g$" is the acceleration due to gravity. Specifically, in the light of the various examples described below, we have found that the various factors should be selected to fit substantially the following formula which we have established as a measure of optimum operating conditions in the "projecting" case, hereinafter designated as Formula "A":

$$\frac{n^2 d^2 \sin(\alpha + 3\beta)}{(107 + 20.1Q)^2} = .2165$$

In this formula alpha and beta represent the angles defined above, $n$ is the frequency of vibration in cycles per minute, $d$ is the ampltiude of vibration in inches, and $Q$ is the feed rate of stock in pounds per foot of electrode width per minute.

In the non-projecting case, substantially the same vibrations are involved, with the exception of the alpha angle. In this case we have found that optimum results are obtained by utilizing an electrode orientation in which the beta angle is in the range between $+5°$ and $+15°$. In other words, the electrode is inclined downhill within the specified range, with optimum results at an inclination of substantially 10°.

In this case the direction of non-projecting vibration is established as already defined above, i. e., in a horizontal direction laterally of the feed path. The amplitude and frequency of such vibrations must again be coordinated with the electrode orientation and feed rate, however, to achieve optimum precision of separation. In this case, best results are obtained if the various factors are correlated substantially according to the following formula, hereinafter designated as Formula "B":

$$\frac{n^2 d^2 \sin (37.5° + 3\beta)}{(91.5 + 5.99Q)^2} = .924$$

In both the projecting and non-projecting cases, as indicated by the above ranges and values, the electrode is inclined at an angle substantially less than the normal angle of repose of the particular stock in the absence of an electrostatic field. The manipulation of the stock by specific vibration of the supporting electrode in the coordinated ranges of conditions described above thus feeds the particles in a controlled manner through the electrostatic field to provide the desired thorough inductive charging and conditioning and the prompt removal of desired particles. Specific apparatus for practicing the invention, and specific processing examples which support the suggested selection of operating conditions and coordinating formulas are set forth in detail below.

In the drawings wherein like reference characters indicate like parts:

Figure 1 is a perspective view of one form of electrostatic separator embodying features of the invention;

Fig. 2 is a partial sectional view on the line 2—2 of Fig. 1;

Fig. 3 is a partial sectional view on the line 3—3 of Fig 2;

Fig. 4 is a partial perspective view showing details of the vibratory unit of the device of Figs. 1 to 3;

Fig. 5 is a perspective view of a modified form of upper electrode for use in the device of Figs. 1 to 4 and in the device of Fig. 10;

Figs. 6 and 7 are partial perspective views showing details of construction of the electrode of Fig. 5;

Fig. 8 is a partial perspective view of a further modification of the upper electrode similar to that of Fig. 7;

Fig. 9 is a plan view of still another modified form of upper electrode;

Fig. 10 is a schematic view of a modified electrostatic separator in accordance with the present invention with means for adjustment of the various factors described herein;

Fig. 11 is a graph indicating the relative efficiency of separation as effected by different electrode orientations and vibration angles;

Fig. 16 is a side view of a modified electrostatic separator with downwardly inclined electrodes designed for horizontal vibration transversely of the electrode;

Fig. 17 is a view on the line 17—17 of Fig. 16; and

Fig. 18 is a chart showing the effect on separating efficiency of various accelerations at different electrode angles.

Figure 12:
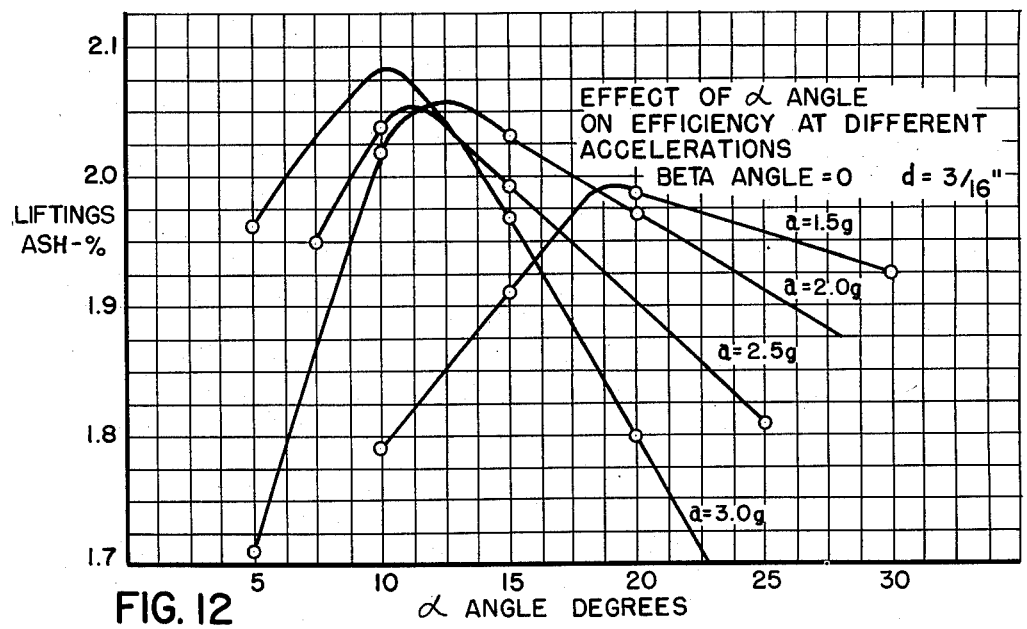
Fig. 12 is a graph indicating the effect of vibration angle variations on separating efficiency for different accelerations.

The device of Figs. 1 to 4, inclusive, is provided with a lower electrode designated generally as 20 and a substantially parallel upper electrode designated at 22. These electrodes are carried by side plates 24 and 26 of insulating material. In the present case these side plates are made of transparent plastic in order that the separating action between the electrodes may be observed more readily. Upper electrode 22 is fastened to side plate 24 by screws 28 and to side plate 26 by screws 30.

Similarly, the lower electrode 20 is connected to the side plates 24 and 26 by screws 32 and 34, respectively. These screws, in turn, engage wooden or insulated cross members 36 which give rigidity to the lower electrode and serve as a means of support of the assembled pair of electrodes. These cross pieces 36 are connected to a longitudinal intermediate support 38 by bolts 40. Intermediate support 38 is provided with downwardly and forwardly inclined legs 42 and 44 which, together with the frame plate 38, constitute a substantially rigid unit.

The rear supporting leg 42 is connected by bolts 46 to an inclined supporting spring 48. The lower end of this supporting spring is mounted by means of bolts 50 on a supporting shoulder 52 of the base member 54.

The forward supporting leg 44 of plate 38 is somewhat longer than the rear leg 42 as shown in Fig. 4. A longitudinal clamping member 56 is fastened to the leg 44 by bolts 58. A horizontal or transverse spring 60 is clamped between members 44 and 56 so that leg 44 is supported at substantially the midpoint of spring 60. Spring 60 is fastened, by means of bolts 62, on supporting posts 64 projecting from an enlarged portion 66 at one end of base 54. Suitable supporting legs 68 space the base 54 the desired distance above the floor or other supporting surface.

Because of the inclination of the longitudinal and transverse springs 48 and 60, respectively, the intermediate frame 38 and the electrodes carried by it are free to vibrate resiliently in a direction substantially perpendicular to the plane of the springs. This direction is indicated in Fig. 2 by arrow 69. Obviously the vibrations in this direction may be said to have both a vertical component, i. e., a component perpendicular to the electrodes 20 and 22, and also a horizontal component, i. e., a component lying substantially in the plane of the electrodes.

In order to cause the desired high frequency vibrations, a magnet 70 is mounted on the supporting base 54 in position to attract intermittently an armature attached to the supporting leg 44. Magnet 70 is connected by wires 72 to a suitable vibratory power source 74 which includes controls 76 for adjustment of the amplitude of vibration and a connection 78 for attachment to the usual power supply line. Alternate energization and deenergization of the magnet 70 by power supply 74 will accordingly cause the desired high frequency vibrations of the frame 38 and electrodes 20 and 22 in the direction of arrow 69 of Fig. 2.

As shown in Fig. 3, the lower electrode 20 includes a relatively smooth, substantially horizontal, supporting surface 80 over which the material to be separated is fed. At the lateral edges of this supporting surface 80 the electrode is provided with downwardly turned flanges 82 which are held in place between the side plates 24 and 26 and the cross members 36 by means of screws 32 previously described.

At the rear end of electrode 20 a supply hopper or chute 84 is provided. The material to be separated, indicated at 86, is fed into this hopper 84 in any desired manner. The material is then fed from the lower end of the hopper beneath a gate member 88 which may be pivoted at 90 to the side walls of the hopper 84. The gate 88 is adjusted so that its lower edge 92 is spaced slightly above the surface 80 of electrode 20, so that the material fed from hopper 84 will move along electrode 20 in a relatively thin uniform layer.

The upper electrode 22 in this embodiment of the invention includes a series of openings 94 separated by intermediate flat areas 96. At the edge of each opening 94 an upwardly projecting flange or rim 98 is provided. This flange prevents material collected on the upper surface of areas 96 from passing back down through openings 94 to the lower electrode. Vertical flanges 100 at each side of the upper electrode 22 prevent inadvertent lateral removal of the material collected on the upper electrode.

The openings 94 are patterned over substantially the entire main area of upper electrode 22. Near the discharge end of the device an unperforated area 102 is provided which conveys the material onto a feed chute 104 from which it is deposited in a suitable receptacle or further hopper 106. Thus the material which is attracted from the lower electrode 20 and projected upwardly through the openings 94 in the upper electrode 22 will be conveyed along the upper surface of the upper electrode and deposited in receptacle 106. This conveying action is preferably achieved by vibration of the upper electrode in the direction indicated by arrow 69 just as these vibrations also serve to convey the material in a uniform stream from hopper 84 along the upper surface of the lower electrode 20.

A further receptacle or chute 108 is provided for collection of the material discharged from the lower electrode 20. Above the discharge edge 109 of this lower electrode 20 an inclined guide or shield 110 is provided. Guide 110 has side flanges 112 which are fastened to side plates 24 and 26 by screws 114.

In order to establish the desired electrostatic field between electrodes 20 and 22, these electrodes are connected to a suitable voltage source. Thus a wire 116 is connected at 118 to the upper electrode 22. The other end of wire 116 is connected to terminal 120 of voltage supply 122. A second wire 124 is connected at one end 126 to the lower electrode 20 and is connected at its other end to the remaining terminal 128 of the voltage supply 122. The voltage supply includes a connection 130 for attachment to the usual A. C. supply line, and also includes a control member 132 for adjustment of the potential difference between terminals 120 and 128, as well as a meter 134 for indicating the potential difference for which the supply 122 is adjusted. Thus the plates 20 and 22 may be maintained at the desired potentials to establish a uniform electrostatic field between them for action on the material in question.

In the case of flour middlings, which include pure bran particles, pure endosperm particles, and particles in which both bran and endosperm are attached in widely varied proportions, we prefer to place the upper electrode 22 at a relatively high negative potential with respect to the lower electrode 20. In the present device, with the electrodes spaced vertically a distance of ¾ inch, excellent separations have been obtained when the upper electrode 22 was maintained at a negative potential of from 3500 to 8,000 volts with respect to lower electrode 20. In other words, a potential difference in the range of 5,000 to 10,000 volts per inch of separation of the electrodes has been found preferable.

In this particular device, the perforations 94 in upper electrode 22 are substantially five-sixteenths of an inch in diameter and are separated by a center-to-center distance of approximately five-eighths to three-quarters of an inch. The openings 94 are substantially staggered over the area of the upper electrode in order that particles at any point transversely of the lower electrode will have an opportunity in their travel along the machine to be projected through some of these openings.

In Figs. 5, 6, and 7, a modified form of upper electrode has been shown for use in connection with the device of Figs. 1 to 4. In this case the electrode, designated generally at 136, includes a series of longitudinal channels 138 separated by longitudinally extending spaces or openings 140. The intermediate channels 138, which cover substantially the main area of the electrode, are made of longitudinal flat strips of material 142 which are transversely cut or notched at 144 a short distance from each end at both sides. The intermediate material between the notches may then be bent upwardly to provide vertical sides or flanges 146 which prevent material collected in the channel 138 from dropping back through openings 140. The flat end portions 148 of each channel member 138 serve to mount the respective channels and to provide the desired spacing between them for openings 140.

The main frame of electrode 136 includes two cross members 150 and 152 at the ends of the electrode in combination with main channels 154 and 156 at each edge.

The discharge end of electrode 136 is provided with a converging spout portion 158.

As shown in Fig. 7, the main side channel 154 includes an inner vertical flange 160 of substantially the same height as the flanges 146 on channels 138. Channel 154 also has an outer flange 162 which is substantially higher than the inner flanges. The ratio of heights in this case is two to one.

As already suggested, the flat portions 148 at the ends of each intermediate channel 138 are placed in abutting relation as shown at 164 to space the channels 138 accurately and furnish a convenient method of assembly.

In the operation of this electrode, the particles which are attracted from the lower electrode with sufficient force will be projected upwardly through openings 140 and will be received in either the side channels 154 or 156 or the intermediate channels 138. The vibratory action of the upper electrode will then convey the projected material down these channels and out of the discharge chute 158 at the end of the electrode.

In Fig. 8, a modification of the electrode construction of Figs. 5 to 7 is shown. In this case the main frame of the electrode including the side channels 154, cross members 150 and 152, and discharge spout 158 will be the same. The intermediate channels 168 of this embodiment are proportionately narrow and closer than the channels 138 of the previous device. These intermediate channels 166 are of substantially U-shape and include a circular bottom portion 168 with upwardly projecting side flanges 170. Flat end portions 172 may be placed in abutting relation at 174 to mount the intermediate channels 166 on cross members 150 and 152 just as in the case of the previous embodiment.

It may be noted that in both the embodiment of Figs. 5 to 7 and that of Fig. 8, the width of the openings between channels is substantially one-half the total width of the channels.

In Fig. 9, a modified construction for the upper electrode is shown. This modified upper electrode 176 includes a main frame or body portion 178 provided with a series of longitudinal channels 180 separated by openings 182. These openings extend generally along the desired direction of feed of the material but are inclined slightly with respect to the longitudinal axis of the electrode in order to increase the probability that particles passing along the lower electrode will at some point have an opportunity to pass through one of the openings 182. Flanges 184 at the edges of the openings prevent return of the material to the lower electrode.

A laterally extending guide or baffle 186 may be provided to guide the material across to one side of the electrode where a discharge spout 188 serves for discharge of the material. In the particular form shown in Fig. 9 the longitudinal inclination of the slots 182 is just great enough so that the end of one slot is in exact longitudinal alignment with the opposite end of the next slot. Thus no matter where a particle is located transversely of the lower electrode, it will have an opportunity at some point in its travel beneath electrode 176 to be projected through one of the slots 182 for collection and removal.

In Fig. 10 a modified form of apparatus is shown schematically, with particular emphasis on the provision of different adjustments for the various factors already discussed. Here the lower smooth supporting electrode is shown at 190. An upper electrode 192 is spaced above the lower electrode on insulating supports 194. Cooperating slots 196 and lock nuts 198 permit adjustment of the vertical spacing between the electrodes. The upper electrode is preferably of one of the types shown in Figs. 5–9.

The stock 200 to be separated is fed to supporting electrode 190 from a hopper 202. An adjustable gate 204, the position of which is controlled by a clamp 206, permits variation in the rate of feed of the stock to the electrode.

The electrodes are supported for the desired vibrations by means of suitable leaf springs 208. The upper ends of these supporting springs 208 are secured rigidly to adjustment plates 210 pivoted at 212 to the lower electrode frame. Slots 214 and clamps 216 permit adjustment of the relative angle between the supporting members 208 and the electrode 190.

Similar adjustments are provided for the supporting plates 218 to which the lower ends of springs 208 are rigidly secured. The lower supporting plates are pivoted at 220 to an intermediate base member 222. The angle between springs 208 and the supporting base 222 may then be adjusted by virtue of slots 224 and clamps 226 in the supporting plate 218 and base 222, respectively.

The angular position of intermediate base 222 may also be adjusted in suitable fashion. Here one end of member 222 is pivoted at 228 to a bracket on the fixed base 230. The other end 232 of intermediate support 222 is adjustably positioned on a support 234 on fixed base 230. An arcuate slot 236, concentric with pivot 228, and a locking screw 238 provide the desired adjustment.

Since springs 208 are of equal length and are mounted so as to remain parallel with each other for all positions of adjustment, the electrode 190 will also remain essentially parallel to intermediate base 222 for different angular adjustments of the supporting springs. Thus the further adjustment of the angle of orientation of intermediate base 222 will control the angle at which the electrode 190 is oriented as shown by the angle beta ($\beta$) in the drawings. The arrangement is also such that for any given beta angle, a change in the adjusted angle of the supporting springs 208 will cause variations in the angle in which the electrode may be vibrated on its spring supports. The path of vibration will be essentially perpendicular to the supporting springs 208 as shown by the dotted line 239. The angle between this direction of vibration and the horizontal is indicated by the single alpha ($\alpha$) in the drawing.

To control the frequency and amplitude of the desired vibrations, a connecting rod 240 has one end pivoted at 242 to one of the electrode supports or frame members near the upper end of one spring 208. The other end 244 of connecting rod 240 is secured to one of a plurality of crank openings 246 in a crank member 248 carried by shaft 250. The selection of different crank openings 246 will provide different amplitudes for the desired vibration as indicated by the symbol "$d$" in the drawing.

Shaft 250 is driven in turn at the desired frequency by connections to a motor 252 and gearbox 254. A conventional speed control actuated by control knob 256 provides a convenient adjustment for the frequency "$n$" in revolutions per minute.

The particles which have been thoroughly conditioned in their passage along the supporting electrode and which have the desired electrostatic characteristics for separation at the voltage levels used to establish the electrostatic field between the electrodes will be attracted through the upper electrode 192, conveyed along the upper surface of that electrode, and removed or separately collected by a suitable hopper or container 258. The particles which are not separated in this manner will be discharged from the lower electrode 190 to a suitable hopper or receptacle 260. The desired relative potential difference between electrodes 190 and 192 can be established and adjusted for the desired degree of separation in the same manner described in connection with the device of Figs. 1–4.

As indicated above, we have found that there is definite useful coordination between the angular orientation of the electrode, as shown by the beta angle and the direction of vibrations as shown by the alpha angle. Fig. 11 is illustrative of such coordination. Here a number of separations were made with flour milling stocks of the type classified as middlings. In each case the strength of the electrostatic field was adjusted by variation of the potential on the upper electrode until the same percentage of stock by weight was lifted to the upper electrode in each run. Samples of the liftings from each separation were checked to determine the percentage of ash therein. This percentage of ash is a standard measure of the efficiency of separation in the flour milling field. A higher percentage of ash indicates that more of the branny particles are lifted, since the elements producing a positive ash determination are present in substantially greater quantities in the bran than in the endorsperm particles of these flour milling stocks.

Thus Fig. 11 shows the relative efficiency of separation in terms of ash percentage in the liftings, for different combinations of electrode orientation and direction of vibration. One conclusion which is immediately obvious from this figure is that for a given electrode orientation, the efficiency reaches a peak within a relatively narrow range of alpha angles for the direction of vibration. The optimum efficiency for separation of these particular stocks, however, further required different directions of vibration for the different electrode orientations. With the electrode horizontal, a low range of positive alpha angles gave superior results. When the electrode was inclined uphill (beta equal to $-5°$) a higher positive alpha angle was required to get the best possible separation. As the electrodes are inclined downhill (beta of $+5°$ and $+10°$), it is even necessary to use negative alpha angles, which, as explained above, may be considered as vibrations tending to push the particles upwardly and rearwardly of the direction of feed, thus prolonging or retarding their passage through the device.

Figure 13:
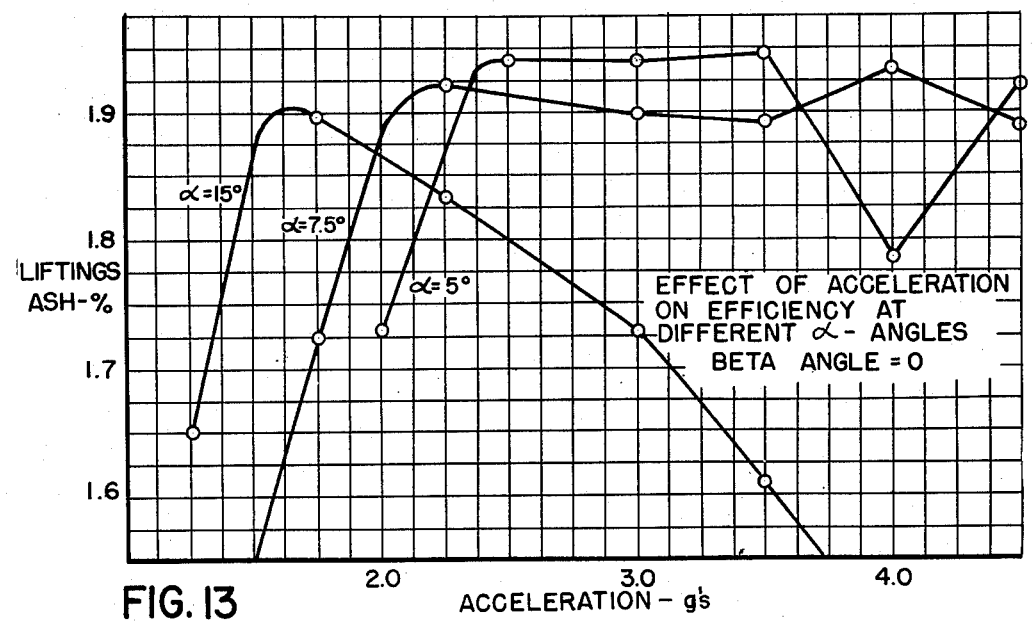
Fig. 13 is a graph illustrating the effect of different accelerations on separating efficiency at various vibration angles.

Figs. 12 and 13 illustrate in graphic form some of the relationships between the direction of vibration and the degree of acceleration. The actual acceleration is determined by the combination of frequency and amplitude of the vibrations. In Fig. 12, for example, it is apparent that for any given acceleration there is again an optimum range of alpha angles for the direction of vibration. As the magnitude of the acceleration is increased, the optimum range of alpha angles definitely shifts to the lower values.

Fig. 13, in addition to confirming the conclusions just expressed, further indicates that accelerations of 2 to 3½ g's provide the highest separating efficiencies, particularly at lower alpha angles. Accelerations substantially greater than 3 to 3½ g's do not appear to produce efficiencies greater than those possible with some accelerations less than 3 g's. Furthermore, there appears to be an advantage in the use of small alpha angles in that a broad range of accelerations may be used without losing top efficiency.

Figure 14:
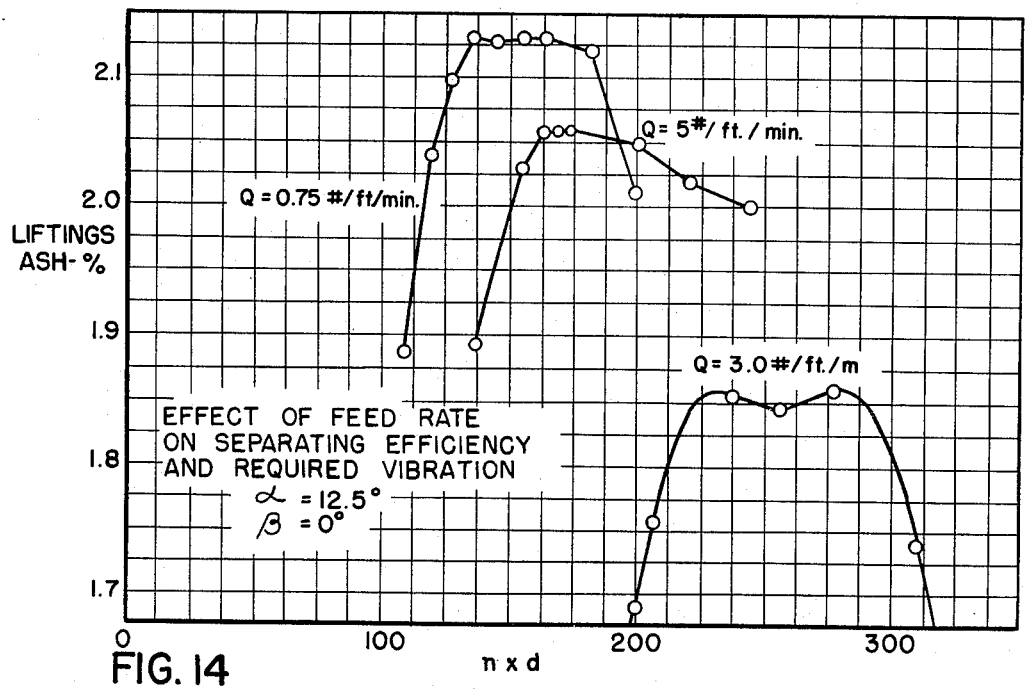
Fig. 14 is a graph showing the effect on separating efficiency of different feed rates at a range of different accelerations.

Fig. 14 illustrates an example of the effect of different feed rates Q on separating efficiency under varying conditions of vibration. Here the frequency and amplitude were varied to produce different accelerations, which are plotted in terms of the product of frequency times amplitude. Higher values in this scale indicate greater accelerations. These results indicate that lower feed rates permit greater efficiency of separation, while higher feed rates reduce the efficiency. The larger feed rates require more vigorous vibration to produce maximum efficiency. The curves indicate that a range of vibration values produce a relatively high efficiency and that the efficiency drops less for a given percentage increase in feed rate when the quantities are smaller than for the same percentage increase when the total quantities are greater. Thus a balance between maximum efficiency of separation and optimum capacity for commercial operation is indicated. We have found that feed rates in the range from ½ to 4½ pounds per foot of electrode width provide the most practical range within which optimum separations in practical quantities can be achieved by suitable coordination of the other factors involved.

Figure 15:
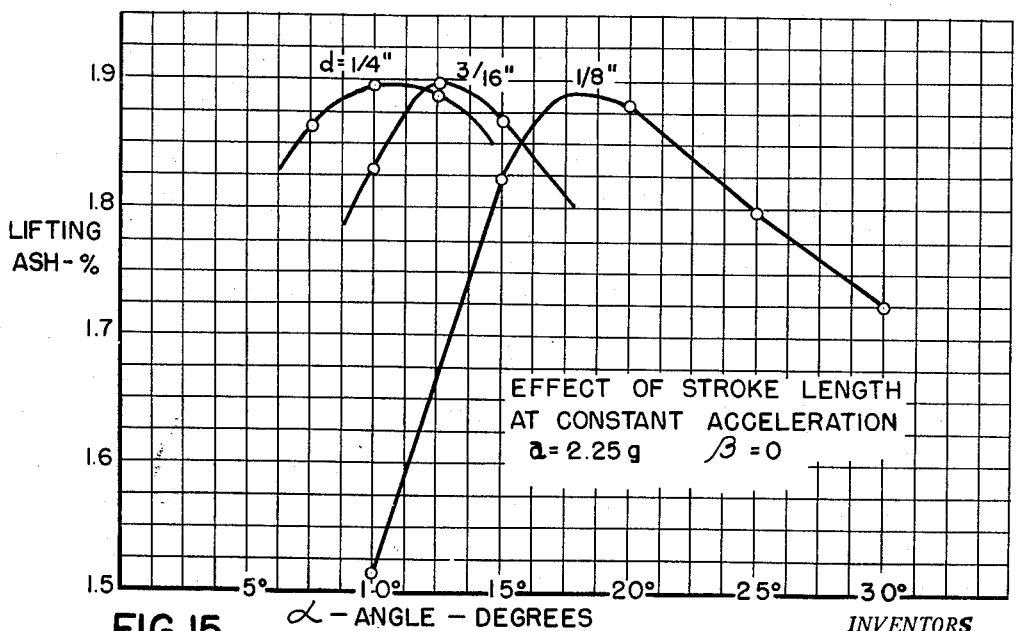
Fig. 15 is a chart illustrating the effect of different stroke lengths or amplitudes of vibration on separating efficiency over a range of different vibration angles at constant acceleration.

Fig. 15 is illustrative of the effect of stroke length on separation efficiency for different directions of vibration. This figure indicates the desirability of obtaining a given acceleration with longer vibration strokes as the alpha angle of vibration direction decreases. The curves indicate that stroke length has some effect in addition to its contribution as one of the factors which determine acceleration. The extra effect of stroke length appears in our previously described Formulas A and B in the term $n^2d^2$. In the present case the formula for the acceleration "$a$" is designated by the following Formula "C":

$$a = \frac{\left(2\pi\frac{n}{60}\right)^2}{g} \times \frac{d}{2\times 12} = \frac{n^2 d}{70{,}300}$$

$a$ = acceleration in multiples of acceleration of gravity ($g$)
$n$ = vibrations per minute
$d$ = total stroke in inches In the separation of the middlings stocks found in flour milling operations, as stated above, best results appear to be obtained at stock moistures substantially in the range about 13% of the dry wheat weight, and preferably at least 14½%, unless some commercial condition indicates a toleration of lesser efficiency. Once the optimum conditions of vibration and electrode orientation are selected, however, the optimum direction of vibration appears to remain independent of changes in the stock moisture. The optimum vibration angle also appears to be independent of vibrations in the size of the stock particles being separated and independent of the percentage of stock which is lifted or separated.

Thus we have found that the desired coordination of the different factors for the so-called "projecting" case can for most practical purposes be expressed in terms of the Formula "A" already described. The formula is believed to produce optimum separation efficiencies for beta angles in the range from −7½° to +7½° with the best possible separation efficiencies relatively close to a beta angle of zero. The accelerations, as indicated above, should be at least 2 to 3½ g, by suitable selection of the amplitude and frequency to fit the above Formula A and at the same time yield the desired acceleration as indicated specifically by Formula "C".

The apparatus shown in Figs. 16 and 17 will now be described. This apparatus is suitable for use when horizontal vibrations are desired in a direction transversely of or perpendicular to the vertical plane extending along the direction of feed of the material. Here the lower electrode 262 supports the stock as it passes through an electrostatic field between the supporting electrode and upper electrode 264. The latter is mounted on supports 266 and its vertical spacing from the lower electrode can be adjusted at 268.

The stock 270 is fed from a hopper 272 by means of a feed gate 274 which may be clamped in any desired adjusted position by means 276 to obtain the desired rate of feed of the stock. One end of the lower electrode frame is pivotally secured at 278 to an intermediate base member 280. The other end of the lower electrode 262 is carried on a bracket 282 on the intermediate base. An arcuate slot 284 and clamping member 286 provide for adjustment of the angular orientation of the lower electrode as indicated by the angle beta.

Intermediate base 280 has a plurality of depending guides 288 which are slidably mounted on transversely extending supporting shafts 290 mounted on brackets 292. Rods 290 extend transversely of the direction of feed of the material down the electrodes and are in effect perpendicular to a vertical plane passing along the direction of feed.

The desired transverse vibrations of the electrodes are achieved by a connecting link 294 one end of which is pivoted at 296 to a bracket on the intermediate base 280. The other end 298 of connecting rod 294 is pivotally secured to the crank member 300 on drive shaft 304. A plurality of crank openings 306 located at different radii on crank 300 permit readjustment of the connection at 298 to provide any one of a selected plurality of different amplitudes "$d$".

Drive shaft 304 is connected through a suitable gearbox 308 to a prime mover or motor 310. The rate of rotation of shaft 304 may be adjusted through a member 312 controlling the gearing. Thus adjustment of member 312 determines the frequency of vibration "$n$" in revolutions per minute.

Fig. 18 illustrates graphically the effects of variation in the amplitude and frequency of vibration at different angular orientations of the lower electrode 262. This graph indicates the desirability of suitable adjustment of the amplitude and frequency in coordination with the different beta angles.

We have found that optimum results in this special case of transverse vibrations may be achieved at electrode orientations in which the beta angle ranges from +5° to +15°, and preferably at substantially 10°. In all of these cases the electrode is inclined downwardly or downhill in the direction of feed. The lateral vibrations at the specified frequencies and amplitudes provide accelerations in which optimum separating efficiencies can be achieved. We have found that these optimum separating efficiencies will be obtained by correlation of the frequency and amplitude according to the Formula "B" already set forth above for this type of vibration. The acceleration must clearly be greater at less steeply inclined electrode angles, while smaller accelerations are needed as the electrode angle increases. The use of the principles exemplified by the chart of Fig. 18 and by the above Formula "B" provides a guide by which optimum separations can be achieved with the horizontal type of non-projecting vibration.

As suggested above, in the case of both the "projecting" and "non-projecting" types of apparatus and vibration, the electrode orientation must be at an angle beta not substantially greater than 15°. In both cases, the accelerations must be greater than 1 $g$. The other factors must be coordinated in the manner above indicated and described.

As a practical matter, the above principles can be applied to a given situation by determination of the condition of vibration or electrode orientation which can be most readily adjusted with the available apparatus. The remaining conditions are then established as close to the described optimum ranges and values as practical considerations permit, and the readily adjustable condition is finally selected as closely as possible within the ranges suggested by the appropriate formula. If desired, a series of several brief test runs at different settings of the most readily adjustable condition can be used to obtain a characteristic curve of separation efficiency and thus check the selection of specific optimum conditions within the ranges indicated.

According to the foregoing description, several devices have been described which make it possible to carry out the improved methods of the present invention. In each of these devices, the material to be separated is conditioned electrically throughout a substantial portion of its travel, while at the same time, the material being conditioned is within the field of an attracting electrode which can attract and remove the desired particles just as soon as the conditioning operation is complete. In these devices a very precise and accurate balance is achieved between the gravitational forces on the particles and the forces of electrostatic attraction.

While other methods may be used in some cases for the prompt removal of attracted particles as soon as they are lifted, the use of an upper electrode provided with openings through which the particles may be projected offers distinct advantages in combination with the other features of the present invention. Such an electrode not only provides a substantially uniform electrostatic field of the desired type but also furnishes, by means of its upper surface, a means of conveying the projected particles to a suitable collector. This device has the advantages of simplicity of construction and ease of cleaning and maintenance. Since the upper electrode can be vibrated by direct attachment to the lower plate, no additional moving parts are required for attraction and removal of the particles.

Furthermore, where the upper electrode is provided with openings or perforations, we have found that vibration of this upper electrode is highly desirable as a means of increasing the efficiency of the apparatus. As already pointed out, stationary perforated upper electrodes are old in the electrostatic separation art. With these stationary electrodes, however, some of the particles attracted to the electrode and which fail to strike one of the openings therein frequently strike the solid areas of the electrode and remain attached to it. The accumulation of these particles reduces the efficiency of the device. In the present case, however, the rapid vibrations applied to the upper electrode dislodge the particles which have struck the lower surface of the electrode and make it possible for these particles either to continue upwardly through the openings in the electrode or to return to the lower electrode for more complete charging and subsequent projection.

As mentioned above the charging of the particles must be continued for a substantial distance and time to condition them properly for separation. While some particles are charged sufficiently to be attracted almost immediately, other similar particles are often attracted in even greater quantity farther along in their travel. There is apparently a question of probabilities involved, i. e., both the probability that different areas of a given individual particle will contact the lower metallic plate a sufficient number of times and in a sufficient number of different positions so that the particle will approach its maximum charge-to-mass ratio, or at least the critical charge-to-mass ratio for the particular operating condition, and also the probability that the particle, when finally charged and attracted, will pass through one of the openings instead of striking other particles or a solid portion of the attracting electrode and having to start the process again.

The particles of non-conducting material have been compared above to condensers which have a certain time constant in connection with their charging operation. In such a case, theoretically, the maximum charge is reached only after an infinite time. For this reason it should be understood that we have used the term "fully charged" and similar expressions in the claims in a relative rather than an absolute sense, to indicate that the maximum charge for a given particle is substantially approached, even though actually it may never be quite reached.

Also, the expression "electrical equilibrium" has been used to denote the condition of a particle which has been charged sufficiently so that further agitation or contact with the metallic support electrode in the presence of the particular electrostatic field will not change substantially the charge on the particle. In other words, the charges gained by further contacts will substantially balance the charges lost during such contacts so that the rates of gain and loss of charge are in equilibrium.

As already pointed out, each type of particle seems to have a maximum charge-to-mass ratio which is characteristic of the nature of the particle under the particular conditions of operation. This maximum ratio may be dependent to some extent on the strength of field and the violence of the agitation. But for a given field strength and vibration, there appears to be a characteristic maximum which can be used to achieve precise and efficient separations according to the methods and apparatus described herein.

While we have advanced various theories as to the operation of the present apparatus, the fact remains that the combination of structural features and the methods recommended herein achieve a very precise balance of forces on the particles to be separated so that extreme precision in separation is made possible.

While the above principles and teachings are considered generally applicable to the separation of organic poorly conducting particles from other organic particles, the separation of wheat flour milling stocks presents a special problem because of the presence of such a large number of different types of particles in which bran and endosperm are present in a wide range of proportions which vary only slightly from type to type. Thus the invention has particular applicability to the electrostatic separation of such stocks. In the milling of flour, the present apparatus and method may be used for electrostatic middlings purification on a satisfactory commercial scale without drying the stock below the moisture content normally used in milling. For example, stock with 14 percent moisture has been separated successfully by the apparatus described herein, while attempts to separate such stocks on the best electrostatic machines previously available have been unsuccessful.

The theories of operation have been discussed at some length in order that others may be better able to understand and apply the methods and apparatus of the invention. It should be understood, however, that the invention is not to be limited by the particular theories advanced.

In view of the principles set forth herein, we have shown some of the ways of carrying out the present invention and some of the equivalents which are suggested by these disclosures. This application is a continuation-in-part of our prior application Serial No. 108,476, filed August 4, 1949.

We claim as our invention:

1. The method of electrostatic separation of stock having at least two different types of organic particles therein to be separated from each other, both of which are relatively poor electrical conductors, which comprises the steps of (a) feeding the stock in a predetermined path along the upper surface of an electrically conducting electrode plate, while maintaining the electrode at a predetermined electric potential, and maintaining a substantially uniform electrostatic field immediately above the electrode; (b) manipulating the particles by rapidly and repeatedly contacting different areas of the individual particles with the electrode while the particles are in the field, thereby repeatedly exposing said different particle areas to the possibility of inductive charging; (c) promptly removing from the field and separately collecting particles which acquire a sufficient charge to move upwardly in said field a predetermined distance above said electrode; and (d) prolonging the period of possible inductive charging by maintaining said electrode at an angular orientation along the path of feed which is less than the normal angle of repose of said stock, while causing relative vibratory movement between the electrode and the particles at a frequency, amplitude and direction which, in combination with the limited orientation of said plate in respect of the horizontal, delays the movement of the stock along the path until substantially all particles of at least one of said types have been urged upwardly said predetermined distance, said relative vibratory movement being in a direction of projecting vibrations along a linear path in a vertical plane extending along the direction of feed, and the frequency, amplitude, and direction of vibration and the electrode angle having correlated values which correspond substantially to those indicated by the following formula:

$$\frac{n^2 d^2 \sin(\alpha+3\beta)}{(107+20.1Q)^2} = .2165$$

wherein $n$ is the frequency of vibration in cycles per minute, $d$ is the amplitude of vibration in inches, Q is the feed rate of stock in pounds per foot of electrode width per minute, alpha is the angle between the direction of the vibration stroke and the horizontal, and beta is the angle between the plane of the lower electrode and the horizontal.

2. The method of electrostatic separation of stock having at least two different types of organic particles therein to be separated from each other, both of which are relatively poor electrical conductors, which comprises the steps of (a) feeding the stock in a predetermined path along the upper surface of an electrically conducting electrode plate, while maintaining the electrode at a predetermined electric potential, and maintaining a substantially uniform electrostatic field immediately above the electrode; (b) manipulating the particles by rapidly and repeatedly contacting different areas of the individual particles with the electrode while the particles are in the field, thereby repeatedly exposing said different particle areas to the possibility of inductive charging; (c) promptly removing from the field and separately collecting particles which acquire a sufficient charge to move upwardly in said field a predetermined distance above said electrode; and (d) prolonging the period of possible inductive charging by maintaining said electrode at an angle of not more than 7½° above or below the horizontal along the direction of feed, while causing relative vibratory movement between the electrode and the particles in a direction of projecting vibrations along a linear path in a vertical plane extending along the direction of feed, at a frequency, amplitude and direction which, in combination with the limited orientation of said plate in respect of the horizontal, delays the movement of the stock along the path until substantially all particles of at least one of said types have been urged upwardly said predetermined distance.

3. The method of electrostatic separation according to claim 2 in which the stock is conditioned to a moisture content of at least 13%.

4. The method of electrostatic separation according to claim 2 in which the vibrations are carried out at a frequency and amplitude which provide accelerations of at least 2 "g" along the direction of vibration, where "g" is the acceleration due to gravity.

5. The method of electrostatic separation according to claim 4 in which the angle between said direction of vibration and a horizontal line along the direction of feed is selected in the range from substantially +45° (above the horizontal) to −20° (below the horizontal) at a value substantially corresponding to that indicated by the following formula:

$$\frac{n^2 d^2 \sin(\alpha+3\beta)}{(107+20.1Q)^2} = .2165$$

wherein $n$ is the frequency of vibration in cycles per minute, $d$ is the amplitude of vibration in inches, Q is the feed rate of stock in pounds per foot of electrode width per minute, alpha is the angle between the direction of the vibration stroke and the horizontal, and beta is the angle between the plane of the lower electrode and the horizontal.

6. The method of electrostatic separation of stock having at least two different types of organic particles therein, both of which are relatively poor electrical conductors, which comprises the steps of (a) feeding the stock in a predetermined path along the upper surface of an electrically conducting flat supporting electrode having a substantially uniform electrostatic field immediately above it; (b) repeatedly manipulating the particles and thereby contacting a plurality of different areas of each particle with the electrode while the particle is in said field; (c) prolonging the time of movement of the particles through said field and thereby insuring thorough inductive charging of different areas of the particles until substantially all particles of a predetermined number of types have been urged upwardly a predetermined distance above the electrode; and (d) immediately removing from the field and separately collecting particles of said types as soon as possible after each such particle has moved upwardly beyond said predetermined distance; said manipulating and prolonging steps including the step of maintaining the electrode at an angular orientation along the path of feed which is substantially less than the normal angle of repose of said stock, and causing relative vibration of the electrode in a direction of non-projecting fibrations along a linear horizontal path perpendicular to the direction of feed at a frequency and amplitude substantially corresponding to those indicated by the following formula:

$$\frac{n^2 d^2 \sin(37.5°+3\beta)}{(91.5+5.99Q)^2} = .924$$

wherein $n$ is the frequency of vibration in cycles per minute, $d$ is the amplitude of vibration in inches, Q is the feed rate of stock in pounds per foot of electrode width per minute and beta is the angle between the plane of the lower electrode and the horizontal.

7. The method of electrostatic separation of wheat flour middlings stock which is conditioned to a moisture content of at least 13% and has at least two different types of organic particles therein, both of which are relatively poor electrical conductors, which comprises the steps of (a) feeding the stock in a predetermined path along the upper surface of an electrically conducting flat supporting electrode having a substantially uniform electrostatic field immediately above it; (b) repeatedly manipulating the particles and thereby contacting a plurality of different areas of each particle with the electrode while the particle is in said field; (c) prolonging the time of movement of the particles through said field and thereby insuring thorough inductive charging of different areas of the particles until substantially all particles of a predetermined number of types have been urged upwardly a predetermined distance above the electrode; and (d) immediately removing from the field and separately collecting particles of said types as soon as possible after each such particle has moved upwardly beyond said predetermined distance; said manipulating and prolonging steps including the step of maintaining the supporting electrode at an angle of not more than 7½° above or below the horizontal while causing projecting vibrations of said electrode along a linear path in a vertical plane extending along the direction of feed.

8. The method of electrostatic separation of wheat flour middlings stock which is conditioned to a moisture content of at least 13% and has at least two different types of organic particles therein, both of which are relatively poor electrical conductors, which comprises the steps of (a) feeding the stock in a predetermined path along the upper surface of an electrically conducting flat supporting electrode having a substantially uniform electrostatic field immediately above it; (b) repeatedly manipulating the particles and thereby contacting a plurality of different areas of each particle with the electrode while the particle is in said field; (c) prolonging the time of movement of the particles through said field and thereby insuring thorough inductive charging of different areas of the particles until substantially all particles of a predetermined number of types have been urged upwardly a predetermined distance above the electrode; and (d) immediately removing from the field and separately collecting particles of said types as soon as possible after each such particle has moved upwardly beyond said predetermined distance; said manipulating and prolonging steps including the step of maintaining the supporting electrode at an angle in the range from 5° to 15° below the horizontal along the direction of feed, while causing non-projecting vibrations of said electrode along a horizontal path in the plane of the electrode and substantially perpendicular to the direction of feed.

9. The method of electrostatic separation according to claim 8 in which said electrode is maintained at an angle of substantially 10°.

10. The method of electrostatic separation of wheat flour middlings stock having at least two different types of particles in which bran and endosperm may be present in varying proportions which comprises conditioning the stock to a moisture content of at least 13%, feeding the stock along the upper surface of an electrically conducting lower electrode at a feed rate Q of not more than 4.5 pounds per foot of electrode width per minute, maintaining the supporting electrode in the range from 7½° above the horizontal to 7½° below the horizontal along the direction of feed, maintaining an electrostatic field above the electrode, promptly removing and separately collecting those particles which move a predetermined distance above the lower electrode, and vibrating the lower electrode at a frequency and amplitude providing projecting accelerations of at least 2 "g" in a vertical plane extending along the direction of feed, the frequency, amplitude and direction of vibration and the electrode angle having correlated values which correspond substantially to those indicated by the following formula:

$$\frac{n^2 d^2 \sin(\alpha+3\beta)}{(107+20.1Q)^2} = .2165$$

wherein $n$ is the frequency of vibration in cycles per minute, $d$ is the amplitude of vibration in inches, $Q$ is the feed rate of stock in pounds per foot of electrode width per minute, alpha is the angle between the direction of the vibration stroke and the horizontal, and beta is the angle between the plane of the lower electrode and the horizontal.

11. The method of electrostatic separation according to claim 10 including the step of conditioning said stock to provide a moisture content of substantially 14½% during such separation.

12. The method of electrostatic separation according to claim 10 in which the angle between said direction of vibration and the horizontal is in the range from substantially 45° above the horizontal to 20° below the horizontal.

13. The method of electrostatic separation according to claim 10 in which the electrode is horizontal and the angle between the direction of vibration and the horizontal is in the range from substantially 10° to 20° above the horizontal.

14. The method of purifying stock having at least two different types of organic particles therein both of which are relatively poor conductors of electricity but are capable of slowly acquiring frictional charges and induced charges until a charge-to-mass ratio is reached which is characteristic of each type of particle, which comprises: (a) feeding the stock along a path through a substantially constant and uniform electrostatic field bounded by parallel-extending, vertically-spaced electrodes; (b) repeatedly contacting the particles with the lower electrode; (c) repeatedly projecting the particles upwardly away from the lower electrode; (d) continuing said feeding, contacting, and projecting steps until substantially all particles of a predetermined number of types have reached their critical characteristic charge-to-mass ratios and have been urged upwardly to the upper electrode; and (e) immediately removing particles of said types reaching the upper electrode vertically through the electrode as soon as they have been urged upwardly to said electrode.

15. The method according to claim 14 in which said path is at zero potential and said lower electrode is grounded throughout the process.

16. The method according to claim 14 in which the stock is comminuted cereal grain stock of normal milling moisture content having particles of a plurality of different types in which bran and endosperm are present in a range of proportions varying slightly from type to type and in which the potential in said electrostatic field at the upper electrode is negative with respect to the potential at said lower electrode.

17. The method according to claim 16 in which said electrostatic field is maintained at a strength in the range from 5,000 to 10,000 volts per inch of distance between the electrodes.

18. The method of purifying stock having at least two different types of organic particles therein both of which are substantially non-conductors of electricity but are capable of slowly acquiring frictional charges and induced charges until different charge-to-mass ratios are reached which are characteristic of each type of particle, which comprises: (a) feeding the stock along a substantially horizontal path through a substantially constant and uniform electrostatic field bounded by parallel-extending, vertically-spaced electrodes; (b) repeatedly contacting the particles with the lower electrode; (c) repeatedly projecting the particles upwardly away from the lower electrode by a series of force impulses having a vertical component and frequency insuring repeated vertical separation of the particles from the lower electrode, said force impulses also having a horizontal component and frequency providing the primary force for feeding the particles along said path; (d) continuing said feeding, contacting and projecting steps until substantially all particles of a predetermined number of types have reached their critical characteristic charge-to-mass ratio and have been urged upwardly to the upper electrode, and (e) immediately removing particles of said types reaching the upper electrode vertically through the electrode as soon as they have been urged upwardly to said electrode.

19. The method of purifying stock having at least two different types of substantially non-conducting particles therein which have the property of acquiring frictional charges of the same polarity in response to rubbing engagement with a conducting support, which comprises: (a) feeding the stock along a path through a substantially constant and uniform electrostatic field bounded by parallel-extending, vertically-spaced electrodes, the upper electrode having a relative potential with respect to the potential of the lower electrode which is opposite in polarity to that of the frictional charges acquired by the particles from frictional contact with the lower electrode; (b) repeatedly contacting the particles with the lower electrode; (c) repeatedly projecting the particles upwardly away from the lower electrode; (d) continuing said feeding, contacting, and projecting steps until substantially all particles of a predetermined number of said types have been urged upwardly in said field at least once beyond a predetermined distance above the lower electrode; and (e) immediately removing from the field and separately collecting particles of said types as soon as possible after each such particle has moved upwardly beyond said predetermined distance.

20. An electrostatic separator comprising spaced substantially horizontal and parallel upper and lower conducting electrode plates, the upper plate having a plurality of openings therein through which particles attracted from the lower plate may be projected, the plates being spaced from each other a distance less than one-third of their common effective length, means for maintaining the upper plate at a high potential difference with respect to the lower plate, means for moving particles of material through said field along the upper surface of the lower plate and for repeatedly projecting the particles upwardly away from the lower plate and for repeatedly contacting the particles with the lower plate, said moving, projecting and contacting means comprising means for rapidly vibrating the lower plate along an inclined plane with a vertical component of travel and frequency of vibration providing the repeated upward projecting of the particles, and with a horizontal component of travel and frequency of vibration providing the primary means moving the particles horizontally along the lower plate, and means for collecting separately the particles projected through the openings of the upper plate.

21. An electrostatic separator according to claim 20 having an upturned flange at the edge of each opening in the upper plate providing an effective collecting surface for the projected particles on the top of the plate intermediate the openings, and means for rapidly vibrating the upper plate in a direction and at a frequency providing the primary means moving the projected particles along the upper surface of the upper plate.

22. An electrostatic separator according to claim 21 in which the upper and lower plates are rigidly connected for simultaneous vibration along the same inclined plane and at the same frequency.

23. An electrostatic separator according to claim 20 in which the upper electrode openings extend longitudinally of the plate at a small angle with respect to the direction of feed with one end of each opening aligned (in the direction of feed) with the opposite end of an adjacent opening, the plate having upwardly projecting retaining flanges at the edges of each opening providing an effective collecting surface for the projected particles on the top of the plate between the openings.

24. An electrostatic middlings purifier comprising vertically-spaced upper and lower substantially parallel electrically conducting plates, means for moving particles of comminuted cereal grain stock along the lower plate and for repeatedly projecting the particles upwardly away from the lower plate and for repeatedly contacting the particles with the lower plate comprising means for rapidly vibrating the lower plate along an inclined plane having both horizontal and vertical components of travel, the magnitude of the vertical component of travel and the frequency of vibration providing said repeated projecting and contacting of the particles and the horizontal component of travel and the frequency of vibration of said lower plate constituting the sole means for moving the stock along the plate, means for maintaining a relatively high potential difference between the plates, the upper plate having openings through which particles attracted from the lower plate may be projected onto the upper surface of the plate, means for rapidly vibrating the upper plate in a direction and at a frequency conveying the projected particles along the upper surface of the upper plate, and means for collecting separately the particles discharged from the upper surfaces of the respective plates.

25. The method of electrostatic separation of stock having at least two different types of organic particles therein to be separated from each other, both of which are relatively poor electrical conductors, which comprises the step of (a) feeding the stock in a predetermined path along the upper surface of an electrically conducting electrode plate, while maintaining the electrode at a predetermined electric potential, and maintaining a substantially uniform electrostatic field immediately above the electrode; (b) manipulating the particles by rapidly and repeatedly contacting different areas of the individual particles with the electrode while the particles are in the field, thereby repeatedly exposing said different particle areas to the possibility of inductive charging; (c) promptly removing from the field and separately collecting particles which acquire a sufficient charge to move upwardly in said field a predetermined distance above said electrode; and (d) prolonging the period of possible inductive charging by maintaining the electrode at an angle in the range from 5° to 15° below the horizontal along the direction of feed, while causing relative vibratory movement between the electrode and the particles in a direction of non-projecting vibrations along a linear horizontal path perpendicular to a vertical plane extending along the direction of feed, at a frequency and amplitude which, in combination with the limited orientation of said plate in respect of the horizontal, delays the movement of the stock along the path until substantially all particles of at least one of said types have been urged upwardly said predetermined distance.

26. The method of electrostatic separation according to claim 25 in which said vibrations are carried out at a frequency and amplitude which provide accelerations of at least 1 "g" along the direction of vibration, where "g" is the acceleration due to gravity.

27. The method of electrostatic separation according to claim 26 in which the stock is fed at a rate of not more than substantially 4½ pounds per foot of electrode width per minute, and to which the vibrations are carried out at a frequency and amplitude which substantially correspond to those indicated by the following formula:

$$\frac{n^2 d^2 \sin(37.5° + 3\beta)}{(91.5 + 5.99Q)^2} = .924$$

wherein $n$ is the frequency of vibration in cycles per minute, $d$ is the amplitude of vibration in inches, $Q$ is the feed rate of stock in pounds per foot of electrode width per minute and $\beta$ is the angle between the plane of the lower electrode and the horizontal.

28. The method of separation according to claim 27 in which the stock is wheat flour middlings stock and the stock is conditioned to a moisture content of at least 13%.

References Cited in the file of this patent

UNITED STATES PATENTS

| Number | Name | Date |
|---|---|---|
| 880,891 | Lawson | Mar. 3, 1908 |
| 1,020,063 | Sutton | Mar. 12, 1912 |
| 1,116,951 | Sutton | Nov. 10, 1914 |
| 1,179,937 | Kraus | Apr. 18, 1916 |
| 1,355,477 | Howell | Oct. 12, 1920 |
| 1,375,741 | Sutton | Apr. 26, 1921 |
| 2,306,105 | Grove | Dec. 22, 1942 |
| 2,615,570 | Morrison | Oct. 28, 1952 |
| 2,699,869 | Gear | Jan. 18, 1955 |
| 2,707,556 | Gear | May 3, 1955 |
| 2,764,288 | Brastad | Sept. 25, 1956 |

FOREIGN PATENTS

| Number | Country | Date |
|---|---|---|
| 28,782 | Great Britain | Apr. 25, 1912 |
| 112,021 | Australia | May 26, 1939 |
| 223,426 | Germany | Nov. 27, 1908 |
| 687,595 | Germany | Feb. 1, 1940 |
| 705,007 | Germany | Apr. 15, 1941 |

OTHER REFERENCES

"Electrostatic Separation of Solids," by Fraas and Rolston, Industrial and Engineering Chemistry, volume 32, Number 5, pages 600–604.